US010138147B2

(12) United States Patent
Satou et al.

(10) Patent No.: US 10,138,147 B2
(45) Date of Patent: Nov. 27, 2018

(54) WATER TREATMENT DEVICE

(71) Applicant: MITSUBISHI HEAVY INDUSTRIES, LTD., Tokyo (JP)

(72) Inventors: Jun Satou, Tokyo (JP); Susumu Okino, Tokyo (JP); Nobuyuki Ukai, Tokyo (JP); Hideo Suzuki, Tokyo (JP); Hiroshi Nakashoji, Tokyo (JP); Shigeru Yoshioka, Tokyo (JP); Hideaki Sakurai, Tokyo (JP); Naoki Ogawa, Tokyo (JP)

(73) Assignee: MITSUBISHI HEAVY INDUSTRIES ENGINEERING, LTD., Yokohama-shi (JP)

( * ) Notice: Subject to any disclaimer, the term of this patent is extended or adjusted under 35 U.S.C. 154(b) by 19 days.

(21) Appl. No.: 14/899,375

(22) PCT Filed: Jul. 17, 2013

(86) PCT No.: PCT/JP2013/069392
§ 371 (c)(1),
(2) Date: Dec. 17, 2015

(87) PCT Pub. No.: WO2015/008346
PCT Pub. Date: Jan. 22, 2015

(65) Prior Publication Data
US 2016/0145130 A1 May 26, 2016

(51) Int. Cl.
*C02F 1/44* (2006.01)
*B01D 63/00* (2006.01)
(Continued)

(52) U.S. Cl.
CPC ............ *C02F 3/1294* (2013.01); *B01D 65/08* (2013.01); *C02F 3/1273* (2013.01); *C02F 3/208* (2013.01);
(Continued)

(58) Field of Classification Search
CPC ............... B01D 2311/25; B01D 61/08; B01D 2311/2634; B01D 2311/2688;
(Continued)

(56) References Cited

U.S. PATENT DOCUMENTS 3,271,304 A * 9/1966 Cox ..................... B01F 3/0876
210/194
4,192,742 A * 3/1980 Bernard ................. C02F 3/006
210/104
(Continued)

FOREIGN PATENT DOCUMENTS

CN 101139135 A 3/2008
CN 101432233 A 5/2009
(Continued)

OTHER PUBLICATIONS

Office Action dated Sep. 19, 2016, issued in counterpart Chinese Application No. 201380077414.8, with English translation. (16 pages).
Decision to Grant a Patent issued in counterpart Japanese Patent Application No. 2015-527098, with English translation. (6 pages).
Notice of Allowance dated Feb. 3, 2017, issued in counterpart South African Patent Application No. 2015/09236. (2 pages).
(Continued)

*Primary Examiner* — Ana M Fortuna
(74) *Attorney, Agent, or Firm* — Westerman, Hattori, Daniels & Adrian, LLP

(57) ABSTRACT

A water treatment device (1) is provided with: a biological treatment tank (2) for storing a stored liquid (5); a pump (7) for generating a circulating liquid flow formed of the stored liquid (5); a gas-liquid two-phase flow generation device (8) for using the circulating liquid flow to suction a gas containing oxygen, whereby a gas-liquid two-phase flow in which the gas is dispersed in the circulating liquid flow is generated; and a nozzle (12) for injecting the gas-liquid
(Continued)

two-phase flow into the biological treatment tank (2). Such a water treatment device (1) is capable of adequately circulating the stored liquid (5) in the biological treatment tank (2), adequately aerating the stored liquid (5), and adequately treating the stored liquid (5).

2 Claims, 11 Drawing Sheets

(51) Int. Cl.
*C02F 1/00* (2006.01)
*C02F 3/12* (2006.01)
*B01D 65/08* (2006.01)
*C02F 3/20* (2006.01)
*C02F 3/22* (2006.01)

(52) U.S. Cl.
CPC ............ *C02F 3/22* (2013.01); *B01D 2311/04* (2013.01); *B01D 2311/2665* (2013.01); *B01D 2311/2688* (2013.01); *B01D 2315/06* (2013.01); *B01D 2321/185* (2013.01); *C02F 2303/16* (2013.01); *Y02W 10/15* (2015.05)

(58) Field of Classification Search
CPC ............ B01D 2315/06; B01D 2317/02; B01D 2311/2665; B01D 2321/185; C02F 3/1273; C02F 3/1289; Y02W 10/15
See application file for complete search history.

(56) References Cited

U.S. PATENT DOCUMENTS

| | | | | |
|---|---|---|---|---|
| 5,458,414 | A * | 10/1995 | Crump | B01F 3/1221 366/137 |
| 7,147,777 | B1 * | 12/2006 | Porteous | C02F 3/1268 210/259 |
| 7,147,778 | B1 * | 12/2006 | DiMassimo | C02F 3/121 210/605 |
| 7,311,833 | B2 * | 12/2007 | Yamamoto | C02F 3/1268 210/195.2 |
| 8,017,014 | B2 * | 9/2011 | Yoon | B01D 61/16 210/605 |
| 9,199,200 | B2 * | 12/2015 | Drogui | B01D 61/145 |
| 2005/0045557 | A1 * | 3/2005 | Daigger | C02F 3/1215 210/605 |
| 2010/0264080 | A1 | 10/2010 | Livingston et al. | |
| 2011/0315629 | A1 * | 12/2011 | Drogui | B01D 61/145 210/616 |
| 2012/0255902 | A1 * | 10/2012 | Livingston | B01D 61/145 210/607 |
| 2016/0145130 | A1 * | 5/2016 | Satou | B01D 65/08 210/205 |

FOREIGN PATENT DOCUMENTS

| | | |
|---|---|---|
| CN | 102557233 A | 7/2012 |
| DE | 4201167 A1 | 7/1993 |
| DE | 9319593.1 U1 | 3/1994 |
| EP | 2 022 763 A1 | 2/2009 |
| JP | 4-290590 A | 10/1992 |
| JP | H10-85565 A | 4/1998 |
| JP | 2000-51886 A | 2/2000 |
| JP | 2000-157993 A | 6/2000 |
| JP | 2002-210488 A | 7/2002 |
| JP | 2003-205287 A | 7/2003 |
| JP | 2003-311268 A | 11/2003 |
| JP | 3486399 B2 | 1/2004 |
| JP | 3671473 B2 | 7/2005 |
| JP | 2005-329397 A | 12/2005 |
| JP | 3854481 B2 | 12/2006 |
| JP | 2007-105580 A | 4/2007 |
| JP | 2007-190488 A | 8/2007 |
| JP | 4135802 B2 | 8/2008 |
| JP | 2009-061349 A | 3/2009 |
| JP | 2010-17669 A | 1/2010 |
| JP | 2011-177608 A | 9/2011 |
| JP | 2012-106161 A | 6/2012 |
| JP | 5135267 B2 | 2/2013 |
| WO | 2008/038436 A1 | 4/2008 |

OTHER PUBLICATIONS

International Search Report dated Oct. 1, 2013, issued in counterpart Application No. PCT/JP2013/069392, w/English translation (4 pages).
Written Opinion dated Oct. 1, 2013, issued in counterpart Application No. PCT/JP2013/069392, w/English translation (6 pages).
Extended (Supplementary) European Search Report dated Apr. 7, 2016, issued in counterpart European Patent Application No. 13889447.2. (9 pages).
Office Action dated Jun. 27, 2017, issued in counterpart Chinese Application No. 201380077414.8, with English translation (15 pages).

* cited by examiner

WATER TREATMENT DEVICE

TECHNICAL FIELD

The present invention relates to a water treatment device, and particularly relates to a water treatment device used when treating water using a biological treatment.

BACKGROUND ART

There is known a water treatment device that cleans waste water that includes contaminants, such as sewage and plant waste water, using a membrane bioreactor. This water treatment device includes a biological treatment tank, an air diffuser, and a filtration membrane. The biological treatment tank stores activated sludge that contains microorganisms and waste water that flows into the tank. The air diffuser aerates the biological treatment tank by supplying an oxygen containing gas to the activated sludge. The aeration of the biological treatment tank causes the microorganisms to decompose the contaminants in the waste water, breed, and proliferate. The filtration membrane filters a suspension of the treated water and the activated sludge in the biological treatment tank, separating the treated water from the activated sludge. When the activated sludge is aerated, the filtration membrane is cleaned by an upflow generated by rising bubbles, preventing clogging (refer to Patent Documents 1 to 3).

There is known a two-phase high-load activated sludge system that separates microbiota in activated sludge into two phases, and treats water using the two phases. This two-phase high-load activated sludge system includes a first aeration tank and a second aeration tank. The first aeration tank treats untreated waste water using non-agglomerative bacteria only. The second aeration tank further treats the waste water treated by the first aeration tank using activated sludge having excellent protozoa and metazoa that feed upon the non-agglomerative bacteria. Such a two-phase high-load activated sludge system is capable of treating untreated waste water with high efficiency, making it possible to reduce the size of the tanks and decrease excess sludge.

CITATION LIST

Patent Literature

Patent Document 1: Japanese Unexamined Patent Application Publication No. 2011-177608A
Patent Document 2: Japanese Unexamined Patent Application Publication No. 2009-61349A
Patent Document 3: International Publication No. WO/2008/038436

SUMMARY OF INVENTION

Technical Problem

Such a water treatment device should preferably adequately treat contaminants in the waste water, and adequately aerate the activated sludge in the biological treatment tank. The filtration membrane that filters the activated sludge in the biological treatment tank should preferably be adequately cleaned. Such a water treatment device may need to aerate a greater volume of air than that required by the microorganisms in order to adequately clean a membrane surface of the filtration membrane, requiring an increase in power for aeration. Such a water treatment device should preferably decrease the aeration power required to adequately treat the waste water. The two-phase high-load activated sludge system should preferably adequately treat the waste water using non-agglomerative bacteria.

It is an object of the present invention to provide a water treatment device that adequately aerates a stored liquid in the biological treatment tank.

It is another object of the present invention to provide a water treatment device that decreases a power for aerating the biological treatment tank.

It is yet another object of the present invention to provide a water treatment device that adequately cleans a filtration membrane that filters an activated sludge in the biological treatment tank.

It is yet another object of the present invention to provide a water treatment device that adequately treats waste water using non-agglomerative bacteria.

Solution to Problem

A water treatment device according to the present invention includes a biological treatment tank configured to store a stored liquid containing organisms that decompose contaminants, a circulation pump configured to generate a circulating liquid flow in which the stored liquid is extracted to outside the tank and circulated back into the tank, a gas-liquid two-phase flow generation device configured to use the circulating liquid flow to suction a gas containing oxygen and thus generate a gas-liquid two-phase flow in which the gas is dispersed in the circulating liquid flow, and a nozzle configured to inject the gas-liquid two-phase flow into a region in which the stored liquid is stored.

Such a gas-liquid two-phase flow is generated by such a gas-liquid two-phase flow generation device, causing dispersed air bubbles to be finely formed. With the air bubbles being fine, such a water treatment device is capable of increasing an oxygen dissolving efficiency, and supplying enough oxygen to decompose contaminants, even with a small volume of air compared to a conventional air diffuser. Such a water treatment device further injects the gas-liquid two-phase flow into the biological treatment tank, making it possible to circulate the stored liquid throughout the biological treatment tank with high efficiency. By circulating the stored liquid throughout the biological treatment tank, such a water treatment device is capable of adequately agitating the stored liquid, and thus adequately aerating the stored liquid. As a result, such a water treatment device is capable of adequately treating the stored liquid.

The water treatment device further includes a circulating liquid pipe that supplies a circulating liquid to a pump by extracting the stored liquid from a bottom portion of the biological treatment tank.

The stored liquid stored in the bottom portion of the biological treatment tank has less air bubbles. By generating the circulating liquid from the stored liquid having less air bubbles, such a water treatment device is capable of decreasing the air bubbles mixed into the circulating liquid. With the decrease in the air bubbles mixed into the circulating liquid, such a water treatment device is capable of adequately generating a circulating liquid flow using the pump, and adequately generating as gas-liquid two-phase flow using the gas-liquid two-phase flow generation device.

The water treatment device further includes a separation membrane immersed in the stored liquid. At this time, the separation membrane generates treated water by filtering the stored liquid. The nozzle injects the gas-liquid two-phase flow toward the separation membrane.

By injecting the gas-liquid two-phase flow from the nozzle toward the separation membrane, such a water treatment device is capable of more adequately cleaning the separation membrane compared to a conventional water treatment device in which air bubbles in the gas-liquid two-phase flow are supplied from below the separation membrane and the separation membrane is cleaned by an upflow generated by rising air bubbles. As a result, such a water treatment device is capable of adequately filtering the stored liquid, and thus adequately generating treated water.

The region in which the stored liquid is stored includes an upflow portion in which the separation membrane is disposed, and a downflow portion disposed side-by-side with the upflow portion in a horizontal direction. That is, the separation membrane is disposed so that a line segment obtained by orthogonally projecting the downflow portion onto a vertical line includes a line segment obtained by orthogonally projecting the separation membrane onto the vertical line. The circulating liquid pipe extracts the stored liquid from the downflow portion.

By generating an upflow in which the stored liquid ascends in the upflow portion, such a water treatment device is capable of generating a downflow in which the stored liquid descends in the downflow portion. With the upflow and the downflow thus generated, such a water treatment device is capable of adequately circulating the stored liquid throughout the biological treatment tank, and adequately aerating the stored liquid.

The nozzle is formed from a plurality of nozzles which inject the gas-liquid two-phase flow into a plurality of different regions of the separation membrane. Such a water treatment device is capable of more uniformly injecting the gas-liquid two-phase flow into the separation membrane in its entirety, and thus more adequately cleaning the separation membrane even when the separation membrane is relatively large, compared to other water treatment devices that inject a liquid-gas two-phase flow into one nozzle.

Each of the nozzles preferably injects the gas-liquid two-phase flow upward. Such a water treatment device is capable of adequately generating an upflow, and thus more adequately cleaning the separation membrane.

The gas-liquid two-phase flow generation device is disposed above the membrane separation tank. Such a water treatment device allows the gas-liquid two-phase flow generation device to be disposed aboveground when the membrane separation tank is buried underground, making it possible to easily maintain the gas-liquid two-phase flow generation device.

The water treatment device further includes a pipe that supplies the gas-liquid two-phase flow from the gas-liquid two-phase flow generation device to the nozzle, and a gas-liquid agitation device that agitates the fluid that flows through the pipe. By thus preventing air bubbles dispersed in the gas-liquid two-phase flow from coarsening, such a water treatment device is capable of adequately generating an upflow of the stored liquid and the air bubbles, and thus more adequately cleaning the separation membrane.

The pipe is disposed so as to extend through a liquid surface of the stored liquid. Such a water treatment device can be more easily manufactured compared to other water treatment devices in which the pipe extends through a hole formed in a side wall of the membrane separation tank.

The biological treatment tank includes a membrane separation tank configured to form a region in which the separation membrane is disposed, and a biological oxidation tank configured to supply the stored liquid to the membrane separation tank. At this time, the water treatment device of the present invention further includes a biological oxidation tank gas-liquid two-phase flow generation device and a biological oxidation tank nozzle. The biological oxidation tank gas-liquid two-phase flow generation device extracts the stored liquid from the membrane separation tank and uses the circulating liquid flow that circulates the stored liquid to the biological oxidation tank to suction a gas containing oxygen, thereby generating a gas-liquid two-phase flow in which the gas containing oxygen is dispersed in the stored liquid. The biological oxidation tank nozzle supplies the gas-liquid two-phase flow generated by the biological oxidation tank gas-liquid two-phase flow generation device to the biological oxidation tank.

When a load of the contaminants, specifically a biological oxygen demand (BOD) and chemical oxygen demand (COD), is high, decomposition of the contaminants by aeration of the membrane separation tank alone becomes difficult. As such, with the biological oxidation tank arranged in a preceding stage, such a water treatment device makes it possible to facilitate the decomposition of contaminants. The water treatment device further increases the oxygen dissolving efficiency of the biological oxidation tank by generating finer air bubbles using the biological oxidation tank gas-liquid two-phase flow generation device, and supplies enough oxygen to decompose the contaminants, even with a small volume of air compared to a conventional air diffuser.

The biological treatment tank further includes a dispersed bacteria treatment tank configured to store a dispersed bacteria mixture in which non-agglomerative bacteria that decompose contaminants are dispersed, and an activated sludge treatment tank configured to store an activated sludge mixture in which activated sludge that decomposes the dispersed bacteria is suspended. At this time, the dispersed bacteria mixture is supplied to the activated sludge mixture. The circulating liquid is generated by being extracted from the dispersed bacteria mixture. The nozzle injects the gas-liquid two-phase flow into a region in which the dispersed bacteria mixture is stored.

The air bubbles dispersed in the dispersed bacteria mixture are finely formed, making it possible for such a water treatment device to dissolve the oxygen in the dispersed bacteria mixture with high efficiency, and supply enough oxygen to the non-agglomerative bacteria, even with as small volume of air compared to a conventional air diffuser. Further, by injecting the gas-liquid two-phase flow into the dispersed bacteria treatment tank, such a water treatment device is capable of adequately agitating the dispersed bacteria mixture, adequately cleaning a surface of a carrier that carries non-agglomerative bacteria, and thus adequately treating the waste water.

The water treatment device further includes an activated sludge treatment tank nozzle that injects the gas-liquid two-phase flow into a region in which the activated sludge mixture is stored.

By injecting the gas-liquid two-phase flow injected into the activated sludge mixture, such a water treatment device is capable of adequately aerating the activated sludge mixture, and thus adequately treating the waste water.

Advantageous Effects of Invention

The water treatment device of the present invention injects the gas-liquid two-phase flow into the stored liquid, making it possible to circulate the stored liquid in the tank with high efficiency, adequately aerate the stored liquid, and adequately treat the stored liquid.

DESCRIPTION OF EMBODIMENTS

Figure 1:
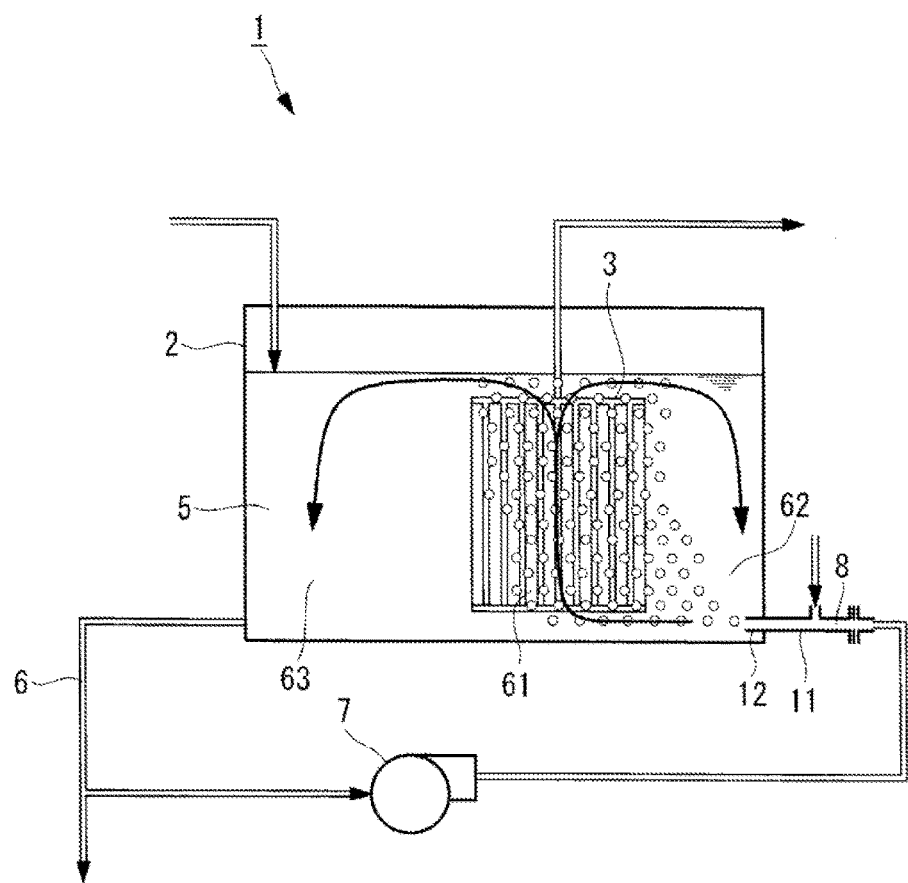
FIG. 1 is a schematic configuration diagram illustrating an embodiment of a water treatment device.

An embodiment of a water treatment device is described below, with reference to the drawings. A water treatment device 1 includes a membrane separation tank 2 and a separation membrane 3, as illustrated in FIG. 1. The membrane separation tank 2 is formed into a vessel, and forms a storage space in an interior thereof. The membrane separation tank 2 stores a stored liquid 5 that contains waste water and activated sludge supplied from outside in the storage space. The activated sludge contains an aerobic microbe group. The stored liquid 5 is aerated by a gas containing oxygen, causing the aerobic microbe group to decompose contaminants in the waste water, breed, and proliferate. Examples of the contaminants include organic matter, and a volume of contaminants in the waste water corresponds to a biological oxygen demand (BOD) and a chemical oxygen demand (COD) in the waste water. The storage space includes an upflow portion 61, a first downflow portion 62, and a second downflow portion 63. The upflow portion 61 is substantially disposed in a center of the storage space. The first downflow portion 62 is disposed side-by-side with the upflow portion 61 in a horizontal direction, along one portion of a side wall of the membrane separation tank 2, between the upflow portion 61 and the side wall. The second downflow portion 63 is disposed side-by-side with the upflow portion 61 in a horizontal direction, along one portion of the side wall of the membrane separation tank 2 opposite to the one portion along the first downflow portion 62, that is, disposed between the upflow portion 61 and the side wall so that the upflow portion 61 is disposed between the first downflow portion 62 and the second downflow portion 63.

The separation membrane 3 is disposed in the upflow portion 61 of the storage space of the membrane separation tank 2 so as to be immersed in the stored liquid 5. The separation membrane 3 is further disposed so that a separation membrane projection line segment obtained by orthogonally projecting the separation membrane 3 onto a vertical line is included in a line segment obtained by orthogonally projecting the first downflow portion 62 onto the vertical line, and the separation membrane projection line segment is included in a line segment obtained by orthogonally projecting the second downflow portion 63 onto the vertical line. The separation membrane 3 is formed by a plurality of modules. Each of the modules is formed by bundling a plurality of hollow fibers. Each of the plurality of hollow fibers is formed by a filtration membrane. The separation membrane 3 generates treated water by filtering the stored liquid 5 using the filtration membrane. A concentration of the contaminants contained in the treated water is less than the concentration of the contaminants contained in the waste water, and the concentration of the aerobic microbe group contained in the treated water is less than the concentration of the aerobic microbe group contained in the stored liquid 5.

The water treatment device 1 further includes a circulating liquid pipe 6, a circulation pump 7, and a gas-liquid two-phase flow generation device 8. The circulating liquid pipe 6 forms a flow path by connecting one end of the circulating liquid pipe 6 to a bottom portion of the second downflow portion 63 of the storage space of the membrane separation tank 2 and the other end to the circulation pump 7. The circulating liquid pipe 6 extracts the stored liquid 5 from the bottom portion of the second downflow portion 63 of the membrane separation tank 2, and supplies the extracted circulating liquid to the circulation pump 7. The circulation pump 7 is disposed outside the membrane separation tank 2. The circulation pump 7 takes in the circulating liquid from the membrane separation tank 2 via the circulating liquid pipe 6 using power externally supplied, generating a flow of the circulating liquid. The gas-liquid two-phase flow generation device 8 is disposed outside the membrane separation tank 2. The gas-liquid two-phase flow generation device 8 generates a gas-liquid two-phase flow using the flow generated by the circulation pump 7. In the gas-liquid two-phase flow, air is dispersed in the circulating liquid.

The water treatment device 1 further includes a gas-liquid two-phase flow pipe 11 and a nozzle 12. The gas-liquid two-phase flow pipe 11 is disposed so as to extend through a hole formed in a section near a bottom portion of the first downflow portion 62 of the side wall of the membrane separation tank 2, connected to the gas-liquid two-phase flow generation device 8 on one end, and disposed in the bottom portion of the first downflow portion 62 of the storage space of the membrane separation tank 2 on the other end. The gas-liquid two-phase flow pipe 11 forms a flow path in which the gas-liquid two-phase flow generated by the gas-liquid two-phase flow generation device 8 flows. The nozzle 12 is disposed in the bottom portion of the first downflow portion 62 of the storage space of the membrane separation tank 2, with a tip end facing a bottom portion of the upflow portion 61. The nozzle 12 is connected to an end of the gas-liquid two-phase flow pipe 11, the end being disposed in the storage space of the membrane separation tank 2. The gas-liquid two-phase flow is thus supplied from the gas-liquid two-phase flow pipe 11, causing the nozzle 12 to inject the gas-liquid two-phase flow toward the bottom portion of the upflow portion 61 of the storage space of the membrane separation tank 2.

Figure 2:
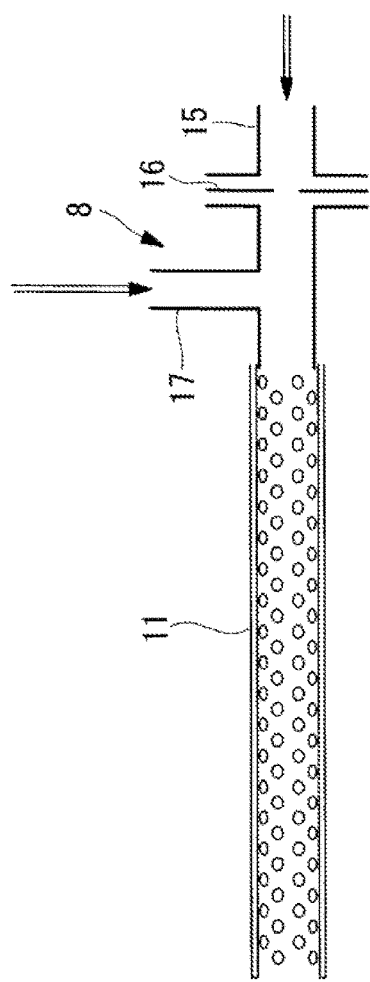
FIG. 2 is a cross-sectional view illustrating a gas-liquid two-phase flow generation device.

FIG. 2 illustrates the gas-liquid two-phase flow generation device 8. The gas-liquid two-phase flow generation device 8 includes a flow intake pipe 15, an orifice 16, and an air suction pipe 17. The flow intake pipe 15 forms a flow path in which the circulating liquid flow generated by the circulation pump 7 flows. The orifice 16 is formed midway on the flow intake pipe 15, and forms a flow path in which the flow generated by the circulation pump 7 flows. A cross-sectional area of the flow path formed by the orifice 16 is less than a cross-sectional area of the flow path formed by the flow intake pipe 15. The air suction pipe 17 forms a flow path in which air flows by disposing one end of the air suction pipe 17 in the atmosphere and connecting the other end to a downstream side of the orifice 16 of the flow intake pipe 15.

The gas-liquid two-phase flow generation device 8 generates negative pressure on the downstream side of the orifice 16 when the circulating liquid flows in the flow intake pipe 15. The occurrence of the negative pressure on the downstream side of the orifice 16 causes the gas-liquid two-phase flow generation device 18 to suction air from the atmosphere via the air suction pipe 17 into the flow intake pipe 15. The suctioning of the air into the flow intake pipe 15 via the air suction pipe 17 causes the gas-liquid two-phase flow generation device 8 to disperse the air in the circulating liquid, and generate a gas-liquid two-phase flow of the circulating liquid having the air dispersed therein. Air bubbles of the air dispersed in the gas-liquid two-phase flow are relatively fine. Such a gas-liquid two-phase flow generation device 8 is known, and examples are used in, for example, technologies disclosed in Japanese Patent No. 3854481 and Japanese Patent No. 3486399.

The water treatment device 1 operates when waste water is externally supplied to the membrane separation tank 2 and the stored liquid 5 is stored in the storage space of the membrane separation tank 2. The separation membrane 3 generates treated water by filtering the stored liquid 5 when immersed in the stored liquid 5. The circulation pump 7 takes in the stored liquid 5 from the bottom portion of the second downflow portion 63 of the membrane separation tank 2 via the circulating liquid pipe 6 when the stored liquid 5 is stored in the storage space of the membrane separation tank 2, and thus generates a flow of the circulating liquid taken in the circulation pump 7. The gas-liquid two-phase flow generation device 8 suctions air from the atmosphere and generates a gas-liquid two-phase flow in which air bubbles of the air are dispersed in the circulating liquid, using the flow generated by the circulation pump 7. The gas-liquid two-phase flow is supplied to the nozzle 12 via the gas-liquid two-phase flow pipe 11. The supply of the gas-liquid two-phase flow from the gas-liquid two-phase flow pipe 11 causes the nozzle 12 to inject the gas-liquid two-phase flow toward the bottom portion of the upflow portion 61 of the membrane separation tank 2.

When the gas-liquid two-phase flow is supplied to the bottom portion of the upflow portion 61 of the membrane separation tank 2, the air bubbles of the an dispersed in the gas-liquid two-phase flow cause the stored liquid 5 to ascend by buoyancy, generating an upflow of the storage liquid 5 in the upflow portion 61 of the storage space of the membrane separation tank 2. The upflow generates a downflow in which the stored liquid 5 flows downward in the first downflow portion 62 and the second downflow portion 63 of the storage space of the membrane separation tank 2. The upflow and the downflow aerate the stored liquid 5 by the air dispersed in the gas-liquid two-phase flow.

Furthermore, the water treatment device 1, with a flow rate of the upflow and the downflow accelerated by the injection of the gas-liquid two-phase flow into the membrane separation tank 2, is capable of adequately forming a circulating liquid flow in which the stored liquid 5 flows throughout the membrane separation tank 2, and adequately agitating the stored liquid 5. The water treatment device 1, with the stored liquid 5 adequately agitated, is capable of prolonging the period in which the air bubbles of the air are dispersed in the stored liquid 5, and thus adequately aerating the stored liquid 5.

The stored liquid 5, being aerated, causes the aerobic microbe group contained in the stored liquid 5 to decompose the contaminants contained in the waste water, breed, and proliferate. The air bubbles dispersed in the gas-liquid two-phase flow, with the gas-liquid two-phase flow having been generated by the gas-liquid two-phase flow generation device 8, are relatively small. The water treatment device 1, with the small size of the air bubbles of the gas-liquid two-phase, is capable of increasing a contact surface area between the stored liquid 5 and the air, and dissolving the oxygen in the stored liquid 5 with high efficiency. The aerobic microbe group, with oxygen thus dissolved in the stored liquid 5 at a high concentration, can breed and proliferate with high efficiency. The water treatment device 1, with the highly efficient breeding and proliferation of the aerobic microbe group, is capable of adequately treating the waste water.

Furthermore, the water treatment device 1, because the nozzle 12 injects the gas-liquid two-phase flow toward the bottom portion of the upflow portion 61 of the membrane separation tank 2, is capable of introducing the upflow to the upflow portion 61 at a higher speed compared to other water treatment devices that gently supply air to the bottom portion of the upflow portion 61 using an air diffuser pipe or the like. The upflow flows through the upflow portion 61, thereby flowing near the separation membrane 3. The upflow flows near the separation membrane 3 along with the air bubbles, thereby cleaning a surface of the separation membrane 3 that comes into contact with the stored liquid 5. The high speed of the upflow that flows near the separation membrane 3 makes it possible for the water treatment device 1 to more adequately clean the separation membrane 3. Adequate cleaning prevents the separation membrane 3 from being clogged and allows the separation membrane 3 to adequately filter the stored liquid 5. As a result, the water treatment device 1 is capable of adequately treating the stored liquid 5.

A portion of the air bubbles mixed into the upflow is released from a liquid surface of the stored liquid 5 into the environment. The upflow thus having a reduced amount of air bubbles causes a downflow of the stored liquid 5 generated in the first downflow portion 62 and the second downflow portion 63 of the storage space of the membrane separation tank 2, and a portion of the air bubbles mixed into the downflow rises, making it possible for such a water treatment device 1 to decrease the air bubbles contained in the stored liquid disposed in the bottom portion of the first downflow portion 62 and the bottom portion of the second downflow portion 63 of the stored liquid 5. The circulating liquid pipe 6 extracts the stored liquid 5 from the bottom portion of the second downflow portion 63, making it possible to decrease the amount of air bubbles mixed into the circulating liquid supplied to the circulation pump 7. As a result, with less air bubbles being mixed into the circulating liquid supplied via the circulating liquid pipe 6, the circulation pump 7 is capable of adequately generating a flow of the circulating liquid. Furthermore, with less air bubbles being mixed into the circulating liquid generated by the circulation pump 7, the gas-liquid two-phase flow generation device 8 is capable of adequately dispersing air into the circulating liquid and adequately generating a gas-liquid two-phase flow.

The water treatment device 1, with the downflow generated in the first downflow portion 62 and the second downflow portion 63, does not need to provide space for the downflow of the downward-flowing stored liquid 5 between the gaps of the plurality of modules that form the separation membrane 3, and is therefore capable of more closely disposing the plurality of modules, allowing compact formation of the separation membrane 3. The separation membrane 3 requires removal from the storage space of the membrane separation tank 2 for maintenance each predetermined period. The water treatment device 1, with the separation membrane 3 thus compactly formed, allows the separation membrane 3 to be handled in a smaller space, making it possible to maintain the separation membrane 3 more easily. Furthermore, the water treatment device 1, with the separation membrane 3 compactly formed, potentially allows the storage space of the membrane separation tank 2 to be formed smaller in size.

Figure 3:
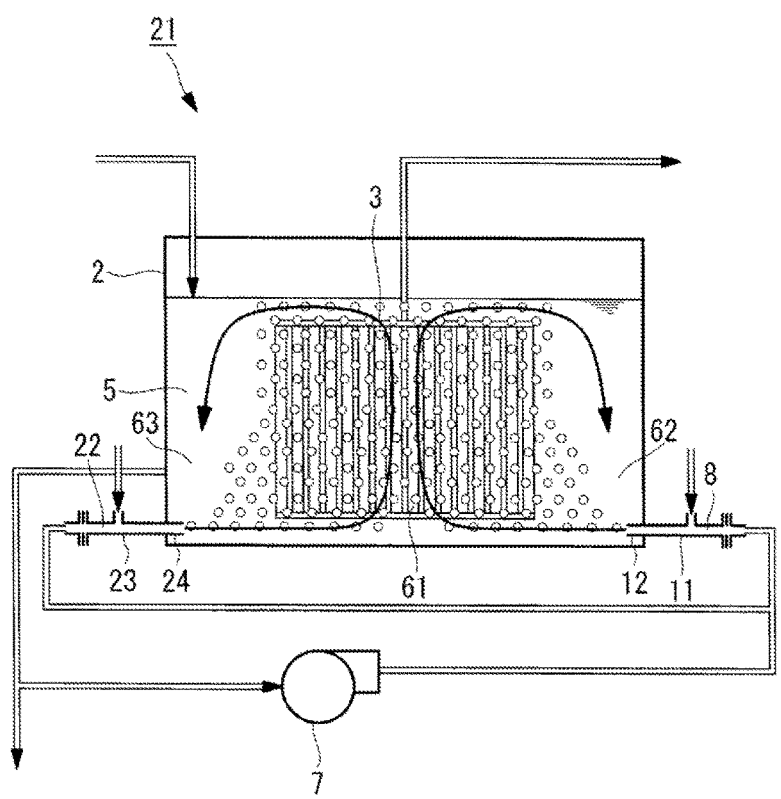
FIG. 3 is a schematic configuration diagram illustrating another embodiment of the water treatment device.

FIG. 3 illustrates another embodiment of the water treatment device. In the water treatment device 21, the water treatment device 1 of the aforementioned embodiment further includes another gas-liquid two-phase flow generation device 22, another gas-liquid two-phase flow pipe 23, and another nozzle 24. The gas-liquid two-phase flow generation device 22 is formed in the same way as the gas-liquid two-phase flow generation device 8. That is, the gas-liquid two-phase flow generation device 22 generates a gas-liquid two-phase flow using the flow generated by the circulation pump 7. The gas-liquid two-phase flow pipe 23 is disposed so as to extend through another hole formed in a section near the bottom portion of the second downflow portion 63 of the side wall of the membrane separation tank 2. That is, the hole is formed in a region opposite to the region in which the hole through which the gas-liquid two-phase flow pipe 11 extends is formed. The gas-liquid two-phase flow pipe 23 is connected to the gas-liquid two-phase flow generation device 22 on one end, and disposed in the storage space of the membrane separation tank 2 on the other end. The gas-liquid two-phase flow pipe 23 forms a flow path in which the gas-liquid two-phase flow generated by the gas-liquid two-phase flow generation device 22 flows. The nozzle 24 is disposed in the second downflow portion 63 of the storage space of the membrane separation tank 2, with a tip end facing the bottom portion of the upflow portion 61 of the storage space of the membrane separation tank 2, that is, with the tip end facing the separation membrane 3. At this time, the region of the separation membrane 3 to which the tip end of the nozzle 24 is directed differs from the region of the separation membrane 3 to which the tip end of the nozzle 12 is directed. The nozzle 24, with the gas-liquid two-phase flow supplied from the gas-liquid two-phase flow pipe 23, injects the gas-liquid two-phase flow toward the bottom portion of the upflow portion 61 of the storage space of the membrane separation tank 2.

In the water treatment device 21, the gas-liquid two-phase flow is injected from the nozzle 12, while the gas-liquid two-phase flow is injected from the nozzle 24. The gas-liquid two-phase flow injected from the nozzle 12 and the gas-liquid two-phase flow injected from the nozzle 24 aerate the stored liquid 5 by the air bubbles of the air dispersed in the gas-liquid two-phase flow.

The air bubbles of the air dispersed in the gas-liquid two-phase flow cause the stored liquid 5 to ascend by buoyancy, and thus the gas-liquid two-phase flow injected from the nozzle 12 and the gas-liquid two-phase flow injected from the nozzle 24 generate an upflow of the stored liquid 5 in the upflow portion 61 of the storage space of the membrane separation tank 2. Such an upflow flows near the separation membrane 3, thereby cleaning the separation membrane 3. Such an upflow flows through a more extensive range compared to the upflow generated by the gas-liquid two-phase flow injected from the one nozzle 12. As a result, the water treatment device 21, by injecting the gas-liquid two-phase flow from a plurality of nozzles, makes it possible to more uniformly cause the upflow to act on the surface of the separation membrane 3, more uniformly clean the surface of the separation membrane 3, and more adequately prevent the clogging of the separation membrane 3 compared to the water treatment device 1 of the aforementioned embodiment, even when the separation membrane 3 is a sufficient size for the one nozzle 12.

Figure 4:
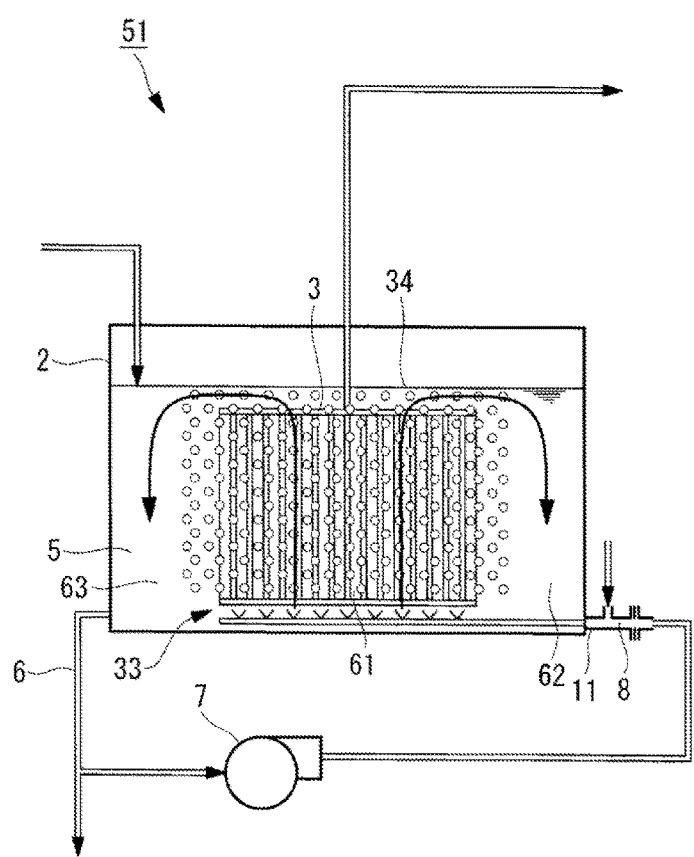
FIG. 4 is a schematic configuration diagram illustrating yet another embodiment of the water treatment device.

FIG. 4 illustrates yet another embodiment of the water treatment device. In a water treatment device 51, the nozzle 12 of the water treatment device 1 of the aforementioned embodiment is replaced with a plurality of nozzles 33. The plurality of nozzles 33 are disposed in the bottom portion of the upflow portion 61 of the storage space of the membrane separation tank 2. The plurality of nozzles 33 are disposed so that the tip ends thereof face upward and toward a plurality of different regions of the separation membrane 3. With the gas-liquid two-phase flow supplied from the gas-liquid two-phase flow pipe 32, the plurality of nozzles 33 inject the gas-liquid two-phase flow upward, that is, toward the separation membrane 3.

The circulating liquid injected upward by the plurality of nozzles 33 in addition to the buoyancy of the air bubbles of the air dispersed in the gas-liquid two-phase flow cause the stored liquid 5 to ascend, and thus the gas-liquid two-phase flow injected from the nozzle 33 generates an upflow of the stored liquid 5 in the upflow portion 61 of the membrane separation tank 2. The upflow generates a downflow in which the stored liquid 5 flows downward in the first downflow portion 62 and the second downflow portion 63 of the storage space of the membrane separation tank 2. The upflow and the downflow aerate the stored liquid 5 by the air dispersed in the gas-liquid two-phase flow.

Such an upflow flows near the separation membrane 3, thereby cleaning the separation membrane 3. Furthermore, such an upflow, with the gas-liquid two-phase flow injected from the plurality of nozzles 33, flows through a more extensive range compared to the upflow generated by the gas-liquid two-phase flow injected from the one nozzle 12. As a result, the water treatment device 31 is capable of more uniformly causing the upflow to act on the surface of the separation membrane 3, more uniformly cleaning the surface of the separation membrane 3, and more adequately cleaning the separation membrane 3 compared to the water treatment device 1 of the aforementioned embodiment, even when the separation membrane 3 is a sufficient size for the one nozzle 12.

Such an upflow, with the gas-liquid two-phase flow injected from the plurality of nozzles 33, flows upward at a higher speed compared to an upflow generated by injecting a gas-liquid two-phase flow in another direction that is not parallel with the upward direction. As a result, the water treatment device 31 is capable of more adequately cleaning the separation membrane 3. The water treatment device 31, with the upflow flowing at a higher speed, is capable of adequately cleaning even a separation membrane 3 having the plurality of modules disposed more closely. The separation membrane 3, with the plurality of modules closely disposed, is compactly formed, resulting in easy handling. This configuration enables the separation membrane 3 of the water treatment device 31 to be more easily maintained.

Furthermore, the water treatment device 31, with the separation membrane 3 compactly formed, potentially allows the storage space of the membrane separation tank 2 to be formed smaller in size.

Figure 5:
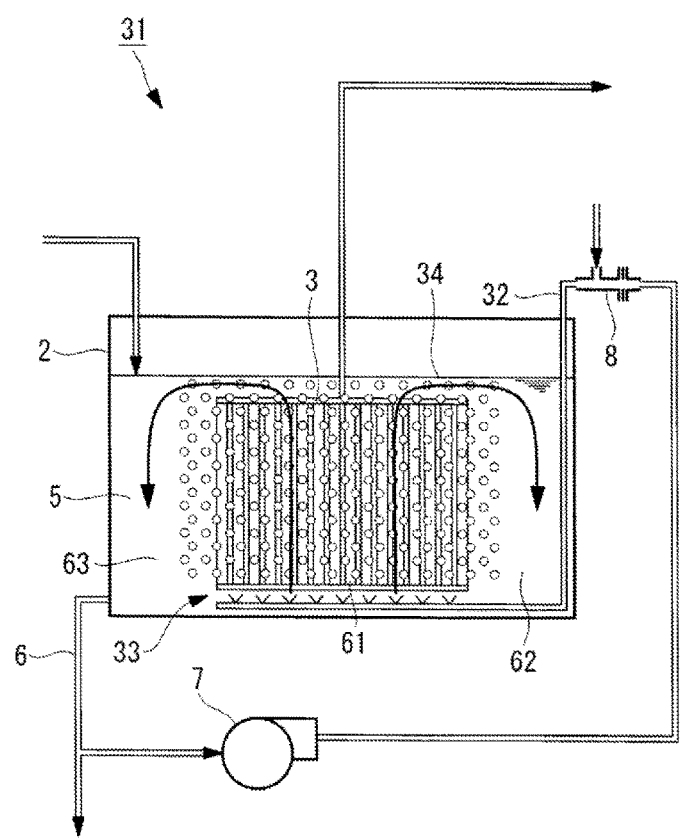
FIG. 5 is a schematic configuration diagram illustrating yet another embodiment of the water treatment device.

FIG. 5 illustrates yet another embodiment of the water treatment device. In the water treatment device 31, the gas-liquid two-phase flow pipe 11 of the water treatment device 51 of the aforementioned embodiment is replaced with another gas-liquid two-phase flow pipe 32. The gas-liquid two-phase flow pipe 32 is disposed so as to extend through a liquid surface 34 of the stored liquid 5, connected to the gas-liquid two-phase flow generation device 8 on one end, and connected to the plurality of nozzles 33 on the other end. The gas-liquid two-phase flow pipe 32 forms a flow path in which the gas-liquid two-phase flow generated by the gas-liquid two-phase flow generation device 8 flows.

Furthermore, the water treatment device 31, with the gas-liquid two-phase flow pipe 32 disposed in the storage space of the membrane separation tank 2 on one end via the liquid surface 34, does not require formation of a hole through which the gas-liquid two-phase flow pipe 32 extends in the membrane separation tank 2. As a result, the water treatment device 31 can be easily manufactured and, in particular, can be easily manufactured by modification even from an existing water treatment device in which the membrane separation tank is buried. For example, when the water treatment device 1 is modified into the water treatment device 21, a hole through which the gas-liquid two-phase flow pipe 32 extends needs to be newly formed in the membrane separation tank 2. Modification of the water treatment device 1 into the water treatment device 31 does not require formation of a new hole in the membrane separation tank 2, and is therefore easier compared to modification of the water treatment device 1 into the water treatment device 21.

At this time, the gas-liquid two-phase flow generation device 8 is disposed above the membrane separation tank 2. The gas-liquid two-phase flow generation device 8, being disposed above the membrane separation tank 2, makes it possible to more easily secure space for air to be taken in by the air suction pipe 17, and more easily secure space utilized for maintenance of the gas-liquid two-phase flow generation device 8.

Figure 6:
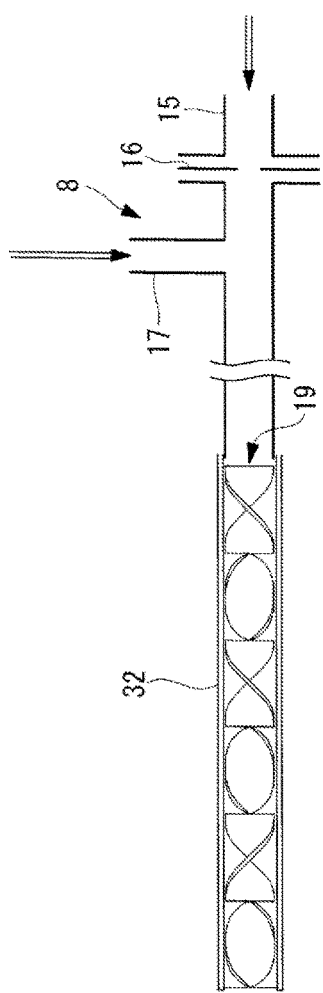
FIG. 6 is a cross-sectional view illustrating a gas-liquid two-phase flow pipe.

FIG. 6 further illustrates the gas-liquid two-phase flow pipe 32. The gas-liquid two-phase flow pipe 32 includes a line mixer 19. The line mixer 19 is formed from a plurality of elements. Each of the plurality of elements is formed into a twisted strip shape. Each of the plurality of elements is disposed in the flow path formed by the gas-liquid two-phase flow pipe 32, and is secured to the gas-liquid two-phase flow pipe 32. When the gas-liquid two-phase flow flows in the gas-liquid two-phase flow pipe 32, the line mixer 19 agitates the gas-liquid two-phase flow by swirling the gas-liquid two-phase flow using the flow of the gas-liquid two-phase flow. The line mixer 19 thus agitates the gas-liquid two-phase flow, thereby preventing the air bubbles of the air dispersed in the gas-liquid two-phase flow from coarsening, even when the gas-liquid two-phase flow pipe 32 is relatively long.

Such a water treatment device 31, by preventing the air bubbles of the air dispersed in the gas-liquid two-phase flow from coarsening, makes it possible to more reliably supply fine air bubbles to the stored liquid 5 and thus more adequately aerate the stored liquid 5 compared to other water treatment devices in which the line mixer 19 is not provided to the gas-liquid two-phase flow pipe 32. It should be noted that the line mixer 19 may be replaced with another gas-liquid agitation device that agitates the gas-liquid two-phase flow that flows through the gas-liquid two-phase flow pipe 32. In this case as well, the water treatment device 31 is capable of preventing the air bubbles dispersed in the gas-liquid two-phase flow from coarsening, more adequately aerating the stored liquid 5, and more adequately cleaning the separation membrane 3.

It should be noted that the gas-liquid two-phase flow pipe 11 of the aforementioned embodiment may include the line mixer 19 in the same way as the gas-liquid two-phase flow pipe 32. The water treatment device that includes the line mixer 19 is capable of preventing the air bubbles dispersed in the gas-liquid two-phase flow from coarsening, more adequately aerating the stored liquid 5, and more adequately cleaning the separation membrane 3, in the same manner as the water treatment device 31. Furthermore, the line mixer 19 may be omitted when the gas-liquid two-phase flow flows through the gas-liquid two-phase flow pipe 32, thereby making the amount of coarsened air bubbles sufficiently small. The water treatment device that omits the line mixer 19 as well, in the same manner as the water treatment device 31 of the aforementioned embodiment, is capable of more adequately aerating the stored liquid 5, and more adequately cleaning the separation membrane 3.

Figure 7:
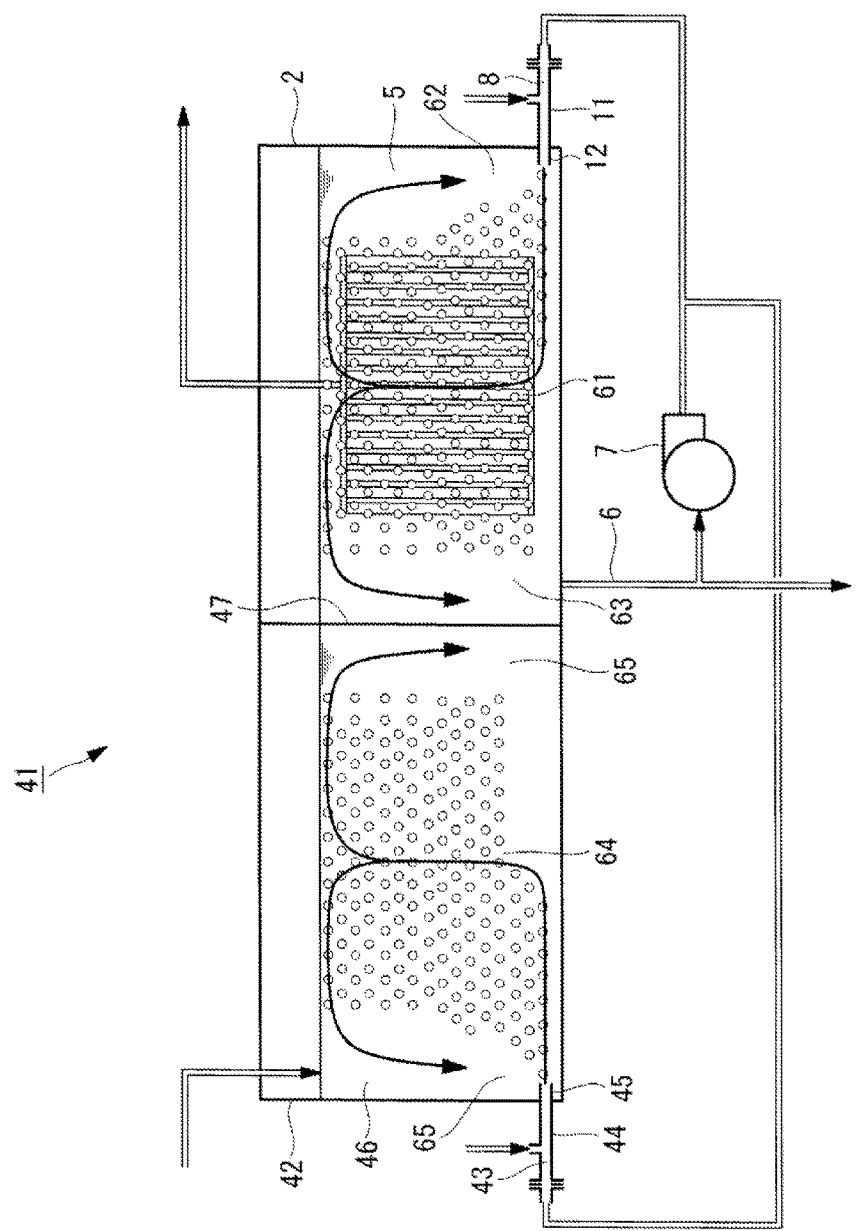
FIG. 7 is a schematic configuration diagram illustrating yet another embodiment of the water treatment device.

FIG. 7 illustrates yet another embodiment of the water treatment device. In the water treatment device 41, the water treatment device 1 of the aforementioned embodiment further includes a biological oxidation tank 42. The biological oxidation tank 42 is formed into a vessel, and forms a storage space in an interior thereof. The biological oxidation tank 42 stores a stored liquid 46 that contains waste water and activated sludge supplied from outside in the storage space. The biological oxidation tank 42 is disposed so as to be adjacent to the membrane separation tank 2, and a barrier 47 that causes the stored liquid 46 to flow over the membrane separation tank 2 is formed between the biological oxidation tank 42 and the membrane separation tank 2. The storage space of the biological oxidation tank 42 includes an upflow portion 64, and a downflow portion 65. The upflow portion 64 is disposed substantially in a center of the storage space. The downflow portion 65 is disposed along one side wall of the biological oxidation tank 42, between the upflow portion 64 and the side wall.

The water treatment device 41 further includes a gas-liquid two-phase flow generation device 43, a gas-liquid two-phase flow pipe 44, and a nozzle 45. The gas-liquid two-phase flow generation device 43 is formed in the same way as the gas-liquid two-phase flow generation device 8. That is, the gas-liquid two-phase flow generation device 43 generates a gas-liquid two-phase flow using the flow generated by the circulation pump 7. The gas-liquid two-phase flow pipe 44 is disposed so as to extend through another hole formed in the biological oxidation tank 42, connected to the gas-liquid two-phase flow generation device 43 on one end, and disposed in the storage space of the biological oxidation tank 42 on the other end. The gas-liquid two-phase flow pipe 44 forms a flow path in which the gas-liquid two-phase flow generated by the gas-liquid two-phase flow generation device 43 flows. The gas-liquid two-phase flow pipe 44 may further include a line mixer on the flow path in the same way as the gas-liquid two-phase flow pipe 32 of the aforementioned embodiment. The nozzle 45 is disposed in a bottom portion of the downflow portion 65 of the storage space of the biological oxidation tank 42. The nozzle 45, with the gas-liquid two-phase flow being supplied from the gas-liquid two-phase flow pipe 44, injects the gas-liquid two-phase flow into a bottom portion of the upflow portion 64 of the storage space of the biological oxidation tank 42.

Such a water treatment device 41 as well, in the same manner as the water treatment device 1 of the aforementioned embodiment, generates treated water by the filtering of the stored liquid 5 stored in the membrane separation tank 2 by the separation membrane 3, and adequately cleans the separation membrane 3 by the injection of the gas-liquid two-phase flow generated by the gas-liquid two-phase flow generation device 8 toward the separation membrane 3.

The nozzle 45, with the gas-liquid two-phase flow being supplied from the gas-liquid two-phase flow pipe 44, injects the gas-liquid two-phase flow toward the bottom portion of the upflow portion 64 of the biological oxidation tank 42. When the gas-liquid two-phase flow is supplied to the bottom portion of the upflow portion 64 of the biological oxidation tank 42, the air bubbles of the air dispersed in the gas-liquid two-phase flow cause the stored liquid 46 to ascend by buoyancy, generating an upflow of the stored liquid 46 in the upflow portion 64 of the storage space of the biological oxidation tank 42. The upflow generates a downflow in which the stored liquid 46 flows downward in the downflow portion 62 of the storage space of the biological oxidation tank 42. The upflow and the downflow aerate the stored liquid 46 stored in the biological oxidation tank 42 by the air dispersed in the gas-liquid two-phase flow injected from the nozzle 45. The aeration of the stored liquid 46 causes the aerobic microbe group contained in the stored liquid 46 to decompose the organic matter contained in the stored liquid 46, breed, and proliferate. The air bubbles dispersed in the gas-liquid two-phase flow, with the gas-liquid two-phase flow being generated by the gas-liquid two-phase flow generation device 43, are relatively small. The water treatment device 41, with the small size of the air bubbles of the gas-liquid two-phase flow, is capable of increasing a contact surface area between the stored liquid 46 and the air, and dissolving the oxygen in the stored liquid 46 with high efficiency. The aerobic microbe group, with the oxygen this dissolved in the stored liquid 46 at a high concentration, can breed and proliferate with high efficiency.

Furthermore, the biological oxidation tank 42 supplies the stored liquid 46 to the membrane separation tank 2 by causing the stored liquid 46 to overflow.

Such a water treatment device 41, with the gas-liquid two-phase flow supplied to the stored liquid 46 stored in the biological oxidation tank 42, is capable of sufficiently aerating the stored liquid 5, even if aeration of the stored liquid 5 is insufficient by the gas-liquid two-phase flow injected toward the separation membrane 3 alone.

An existing water treatment device includes the membrane separation tank in which the separation membrane is disposed and the biological oxidation tank that supplies the stored liquid by overflow to the membrane separation tank. The existing water treatment device generally further includes a circulation pipe and an aeration device that is separate from the circulation pipe. The circulation pile supplies the stored liquid from the membrane separation tank to the biological oxidation tank and, the aeration device aerates the stored liquid of the biological oxidation tank. Such a water treatment device 41 no longer needs to include the aeration device, and therefore can be more easily manufactured compared to the existing water treatment device. Such a water treatment device 41 can be easily manufactured from the existing water treatment device by a modification of adding the gas-liquid two-phase flow generation device to an area midway on the circulation pipe.

It should be noted that the separation membrane 3 may be replaced with another separation membrane that includes a filtration membrane formed into flat membrane. The water treatment device that includes such a separation membrane as well, in the same manner as the water treatment device of the aforementioned embodiment, is capable of more adequately cleaning the separation membrane.

Figure 8:
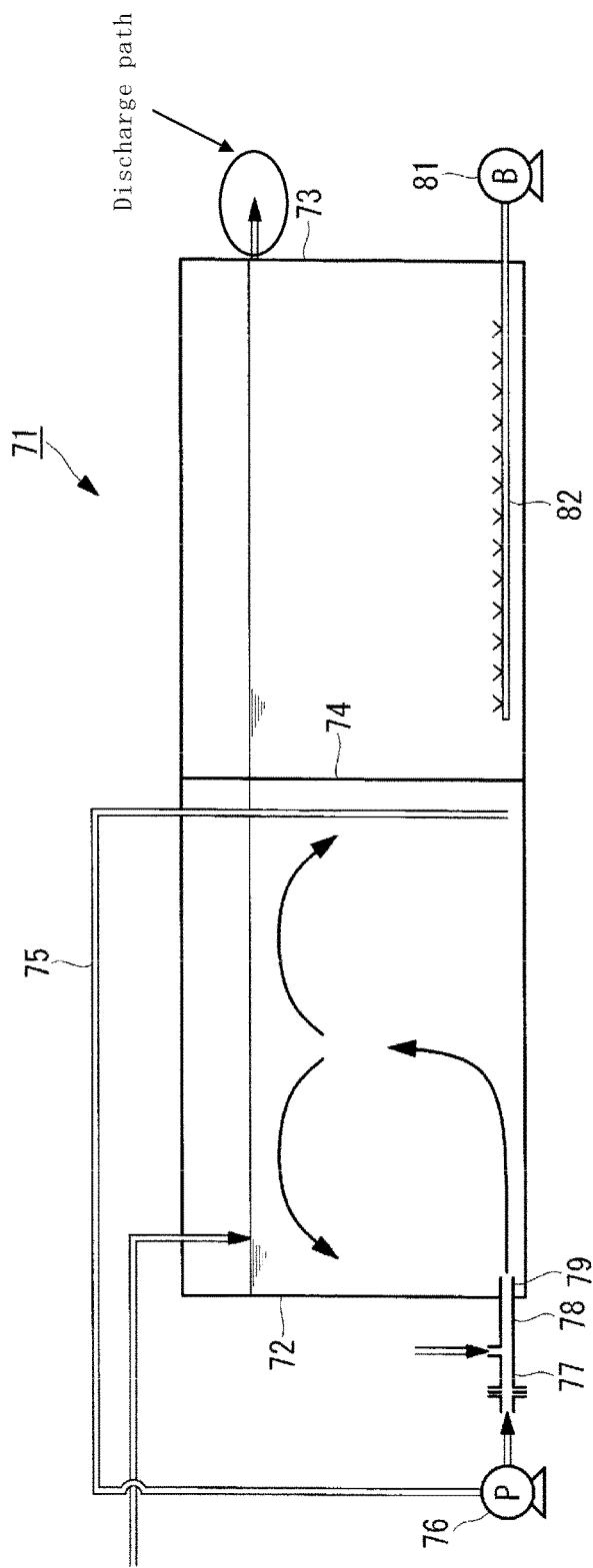
FIG. 8 is a schematic configuration diagram illustrating yet another embodiment of the water treatment device.

FIG. 8 illustrates yet another embodiment of the water treatment device. A water treatment device 71 includes a dispersed bacteria treatment tank 72, an activated sludge treatment tank 73, and a screen 74. The dispersed bacteria treatment tank 72 forms a storage space and stores a dispersed bacteria mixture in the storage space. The dispersed bacteria mixture contains waste water supplied from outside, and non-agglomerative bacteria are dispersed therein without forming a floc. The non-agglomerative bacteria are formed from bacteria and use oxygen dissolved in the dispersed bacteria mixture to decompose the organic matter dissolved in the dispersed bacteria mixture and proliferate. The storage space is filled with a plurality of microorganism immobilizing carriers. Each of the microorganism immobilizing carriers is formed from a porous substance, and is substantially formed into a spherical shape. The microorganism immobilizing carriers hold the non-agglomerative bacteria. Such microorganism immobilizing carriers are known and examples include "Kuragel" (registered trademark) manufactured by Kuraray Co., Ltd.

The activated sludge treatment tank 73 forms a storage space, and stores an activated sludge mixture in the storage space. The activated sludge mixture contains dispersed bacteria treated water and activated sludge supplied by the screen 74. The activated sludge includes non-agglomerative bacteria and microorganisms, and forms a floc in the activated sludge mixture. The microorganisms are protozoa and metazoa relatively larger than the non-agglomerative bacteria. The protozoa and the metazoa use the oxygen dissolved in the activated sludge mixture to decompose the organic matter and non-agglomerative bacteria dissolved in the activated sludge mixture and proliferate.

The screen 74 is formed from a perforated metal obtained by forming a plurality of holes in a metal plate, and is disposed so that the perforated metal is interposed between the storage space of the dispersed bacteria treatment tank 72 and the storage space of the activated slide treatment tank 73. Each of the plurality of holes has a diameter that is less than a diameter of the microorganism immobilizing carriers. The screen 74 supplies the dispersed bacteria treated water of the dispersed bacteria mixture, the treated water having passed through the perforated metal, to the activated sludge treatment tank 73 at a predetermined flow rate. It should be noted that the screen 74 may be replaced with another screen capable of filtering the dispersed bacteria mixture and separating the mixture into a plurality of microorganism immobilizing carriers and dispersed bacteria treated water. Examples of the screen include a wire mesh in which a plurality of gaps, which does not allow passage of the microorganism immobilizing carriers therethrough, are formed.

The water treatment device 71 further includes a circulating liquid pipe 75, a circulation pump 76, and a gas-liquid two-phase flow generation device 77. The circulating liquid pipe 75 is disposed so as to extend through a liquid surface of the dispersed bacteria mixture stored in the dispersed bacteria treatment tank 72, and forms a flow path by connecting one end of the circulating liquid pipe 75 to a bottom portion of the storage space of the dispersed bacteria treatment tank 72 and the other end of the circulating liquid pipe 75 to the circulation pump 76. The circulating liquid pipe 75 extracts the dispersed bacteria mixture from the bottom portion of the dispersed bacteria treatment tank 72, and supplies the extracted circulating liquid to the circulation pump 76. The circulation pump 76 takes in the circulating liquid from the dispersed bacteria treatment tank 72 via the circulating liquid pipe 75 using power externally supplied, and generates a flow of the circulating liquid. The gas-liquid two-phase flow generation device 77 is disposed outside the dispersed bacteria treatment tank 72. The gas-liquid two-phase flow generation device 77 generates a gas-liquid two-phase flow using the flow generated by the circulation pump 76. In the gas-liquid two-phase flow, air is dispersed in the circulating liquid.

The water treatment device 71 further includes a gas-liquid two-phase flow pipe 78 and a nozzle 79. The gas-liquid two-phase flow pipe 78 is disposed so as to extend through a hole formed in a section near a bottom portion of a side will of the dispersed bacteria treatment tank 72. The gas-liquid two-phase flow pipe 78 supplies the gas-liquid two-phase flow generated by the gas-liquid two-phase flow generation device 77 to the nozzle 79. The nozzle 79 is disposed in a bottom portion of the storage space of the dispersed bacteria treatment tank 72. The nozzle 79, with the gas-liquid two-phase flow supplied from the gas-liquid two-phase flow pipe 78, injects the gas-liquid two-phase flow toward the bottom portion of the storage space of the dispersed bacteria treatment tank 72.

The water treatment device 71 further includes a blower 81 and an air diffusing pipe 82. The blower 81 supplies air to the air diffusing pipe 82 using externally supplied power. The air diffusing pipe 82 is disposed in a bottom portion of the storage space of the activated sludge treatment tank 73. With the air being supplied from the blower 81, the air diffusing pipe 82 supplies air bubbles of the air to the activated sludge mixture stored in the activated sludge treatment tank 73, and aerates the activated sludge mixture.

The water treatment device 71 operates when waste water is externally supplied to the dispersed bacteria treatment tank 72. The circulation pump 76 takes in the dispersed bacteria mixture from the bottom of the dispersed bacteria treatment tank 72 via the circulating liquid pipe 75, and thus generates a flow of the circulating liquid taken in the circulation pump 76. The gas-liquid two-phase flow generation device 77 suctions air from the atmosphere and generates a gas-liquid two-phase flow in which air bubbles of the air are dispersed in the circulating liquid, using the flow generated by the circulation pump 76. The gas-liquid two-phase flow is supplied to the nozzle 79 via the gas-liquid two-phase flow pipe 78. The nozzle 79, with the gas-liquid two-phase flow supplied from the gas-liquid two-phase flow pipe 78, injects the gas-liquid two-phase flow toward the bottom portion of the dispersed bacteria treatment tank 72, and aerates the dispersed bacteria mixture.

The dispersed bacteria mixture is agitated by the aeration, and the oxygen is dissolved. The dispersed bacteria mixture, being agitated, is mixed with the waste water externally supplied. The oxygen is dissolved in the dispersed bacteria mixture, and thus the non-agglomerative bacteria dispersed in the dispersed bacteria mixture and the non-agglomerative bacteria held in the microorganism immobilizing carriers use the oxygen to decompose the organic matter contained in the dispersed bacteria mixture, and proliferate.

When a load of the entered waste water becomes low, a biofilm may form on a surface of each of the microorganism immobilizing carriers immersed in the dispersed bacteria mixture. When the biofilm is formed on the surfaces of the microorganism immobilizing carriers, the non-agglomerative bacteria may no longer be able to adequately decompose the organic matter contained in the dispersed bacteria mixture. The dispersed bacteria mixture is then agitated, causing the microorganism immobilizing carriers immersed in the dispersed bacteria mixture to flow through the storage space of the dispersed bacteria treatment tank 72. The flow of the plurality of microorganism immobilizing carriers causes the surfaces of the dispersed bacteria mixture to be cleaned. The plurality of microorganism immobilizing carriers, with the gas-liquid two-phase flow being further injected at high speed from the nozzle 79, can be more adequately cleaned. The plurality of microorganism immobilizing carriers, with the surfaces thereof being adequately cleaned, can adequately hold the non-agglomerative bacteria. The non-agglomerative bacteria adequately held by the plurality of microorganism immobilizing carriers can adequately decompose the contaminants contained in the dispersed bacteria mixture.

The screen 74 filters the dispersed bacteria mixture and separates the mixture into the plurality of microorganism immobilizing carriers and the dispersed bacteria treated water. The screen 74 returns the microorganism immobilizing carriers to the dispersed bacteria treatment tank 72, and supplies the dispersed bacteria treated water to the activated sludge treatment tank 73 at a predetermined flow rate.

When the activated sludge treatment tank 73 stores the activated sludge mixture, the blower 81 supplies air to the air diffusing pipe 82. The air diffusing pipe 82, with the air being supplied from the blower 81, supplies air bubbles of the air to the activated sludge mixture stored in the activated sludge treatment tank 73, and aerates the activated sludge mixture.

The activated sludge mixture is agitated by the aeration, and the oxygen is dissolved. The activated sludge mixture, being agitated, is mixed with the dispersed bacteria treated water supplied from the dispersed bacteria treatment tank 72. The agitation of the activated sludge mixture causes the floc suspended in the activated sludge mixture to flow. The oxygen is dissolved in the activated sludge mixture, and thus the activated sludge contained in the activated sludge mixture uses the oxygen to decompose the organic matter contained in the activated sludge mixture and proliferate. Furthermore, the microorganisms contained in the activated sludge use the oxygen dissolved in the activated sludge mixture to decompose the non-agglomerative bacteria contained in the activated sludge mixture.

The activated sludge mixture is discharged to equipment in a following stage at a predetermined flow rate. Examples of the equipment of the following stage include a sedimentation tank and a membrane separation tank.

The sedimentation tank stores the activated sludge mixture, thereby depositing solid content of the activated sludge mixture and separating the activated sludge mixture into treated water and excess sludge. The sedimentation tank drains the treated water to an outside area at a predetermined flow rate. The sedimentation tank further returns the excess sludge to the activated sludge treatment tank 73 at a predetermined flow rate, and discharges the excess sludge to an outside area at a predetermined flow rate.

The membrane separation tank includes a separation membrane. The separation membrane filters the activated sludge mixture, separating the activated sludge mixture into excess sludge and treated water. The membrane separation tank drains the treated water to an outside area at a predetermined flow rate. The membrane separation tank further returns the excess sludge to the activated sludge treatment tank 73 at a predetermined flow rate, and discharges the excess sludge to an outside area at a predetermined flow rate.

The non-agglomerative bacteria can decompose organic matter other than the microorganisms with higher efficiency compared to the protozoa and the metazoa. As a result, the dispersed bacteria treatment tank 72 is capable of decomposing the organic matter with higher efficiency compared to the activated sludge treatment tank 73. The water treatment device 71 further injects the gas-liquid two-phase flow into the dispersed bacteria mixture, making it possible to dissolve the oxygen in the dispersed bacteria mixture with high efficiency. The non-agglomerative bacteria, with the oxygen being dissolved in the dispersed bacteria mixture with high efficiency, can decompose the organic matter with higher efficiency. As a result, the water treatment device 71 is capable of decomposing the organic matter with higher efficiency compared to other water treatment devices that supply air from the bottom portion of the dispersed bacteria treatment tank 72 using an air diffusing pipe or the like.

The dispersed bacteria treated water drained from the dispersed bacteria treatment tank 72 contains non-agglomerative bacteria. The non-agglomerative bacteria are dispersed in the dispersed bacteria treated water, making the non-agglomerative bacteria less likely to settle as solid content even if stored as is in the sedimentation tank. According to such an operation, the non-agglomerative bacteria form protozoa, metazoa, and a floc in the activated sludge mixture drained from the activated sludge treatment tank 73. Furthermore, the protozoa and the metazoa feed upon the non-agglomerative bacteria. As a result, when the activated sludge mixture is separated into the excess sludge and the treated water, the water treatment device 71 is capable of decreasing a concentration of the non-agglomerative bacteria contained in the treated water with higher efficiency. That is, according to such an operation, the water treatment device 71 is capable of more adequately treating the waste water compared to the water treatment device of a comparison example in which the waste water is treated by only the dispersed bacteria treatment tank 72 that does not include the activated sludge treatment tank 73.

It should be noted that when the water treatment device 71 does not require removal of the non-agglomerative bacteria from the dispersed bacteria treated water separated by the screen 74, the activated sludge treatment tank 73 may be omitted. In such a water treatment device as well, the non-agglomerative bacteria decompose the organic matter with higher efficiency, thereby making it possible to adequately treat the waste water.

Figure 9:
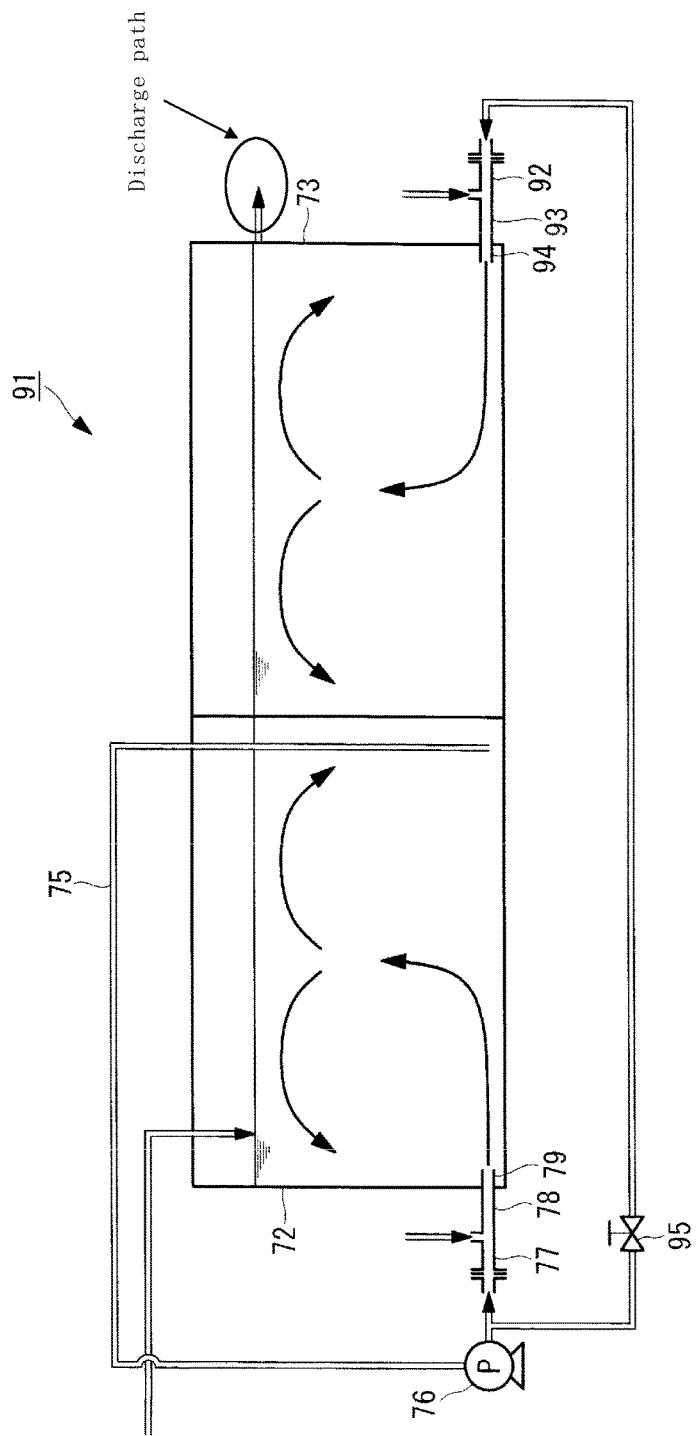
FIG. 9 is a schematic configuration diagram illustrating yet another embodiment of the water treatment device.

FIG. 9 illustrates yet another embodiment of the water treatment device. In a water treatment device 91, the blower 81 and the air diffusing pipe 82 of the water treatment device 71 of the aforementioned embodiment are replaced with a flow rate adjustment valve 95, a gas-liquid two-phase flow generation device 92, a gas-liquid two-phase flow pipe 93, and an activated sludge treatment tank nozzle 94. The flow rate adjustment valve 95 is provided midway on the flow path that supplies flow from the circulation pump 76 to the gas-liquid two-phase flow generation device 92. The flow rate adjustment valve 95 adjusts a flow rate of the flow supplied from the circulation pump 76 to the gas-liquid two-phase flow generation device 77, and a flow rate of the flow supplied from the circulation pump 76 to the gas-liquid two-phase flow generation device 92. The gas-liquid two-phase flow generation device 92 generates a gas-liquid two-phase flow using the flow generated by the circulation pump 76 in the same way as the gas-liquid two-phase flow generation device 77. The gas-liquid two-phase flow pipe 93 is disposed so as to extend through a hole formed in a section near the bottom portion of the side wall of the activated sludge treatment tank 73. The gas-liquid two-phase flow pipe 93 supplies the gas-liquid two-phase flow generated by the gas-liquid two-phase flow generation device 92 to the activated sludge treatment tank nozzle 94. The activated sludge treatment tank nozzle 94 is disposed in the bottom portion of the storage space of the activated sludge treatment tank 73. The activated sludge treatment tank nozzle 94, with the gas-liquid two-phase flow being supplied from the gas-liquid two-phase flow pipe 93, injects the gas-liquid two-phase flow toward the bottom portion of the storage space of the activated sludge treatment tank 73.

The water treatment device 91 injects the gas-liquid two-phase flow into the storage space of the dispersed bacteria treatment tank 72 at high speed, making it possible to more adequately decompose the organic matter in the waste water and more adequately treat the waste water, in the same manner as the water treatment device 71 of the aforementioned embodiment. Furthermore, the water treatment device 91 injects the gas-liquid two-phase flow into the storage space of the activated sludge treatment tank 73 at high speed as well, making it possible to more adequately aerate the activated sludge mixture stored in the activated sludge treatment tank 73 and adequately agitate the activated sludge mixture. The water treatment device 91 more adequately agitates and aerates the activated sludge mixture, making it possible to treat the waste water with higher efficiency compared to the water treatment device 71 of the aforementioned embodiment.

The water treatment device 91 does not need to include the blower 81. As a result, the water treatment device 91 can be more easily manufactured and maintained with less labor compared to the water treatment device 71 of the aforementioned embodiment.

Furthermore, in the water treatment device 91, the gas-liquid two-phase flow generation device 92, the gas-liquid two-phase flow pipe 93, and the activated sludge treatment tank nozzle 94 are capable of supplying the dispersed bacteria mixture stored in the dispersed bacteria treatment tank 72 to the activated sludge treatment tank 73 at a predetermined flow rate. With the dispersed bacteria mixture being supplied to the activated sludge treatment tank 73 at a predetermined flow rate, the water treatment device 91 does not need to include the screen 74 and can therefore be more easily manufactured compared to the water treatment device 71 of the aforementioned embodiment.

Figure 10:
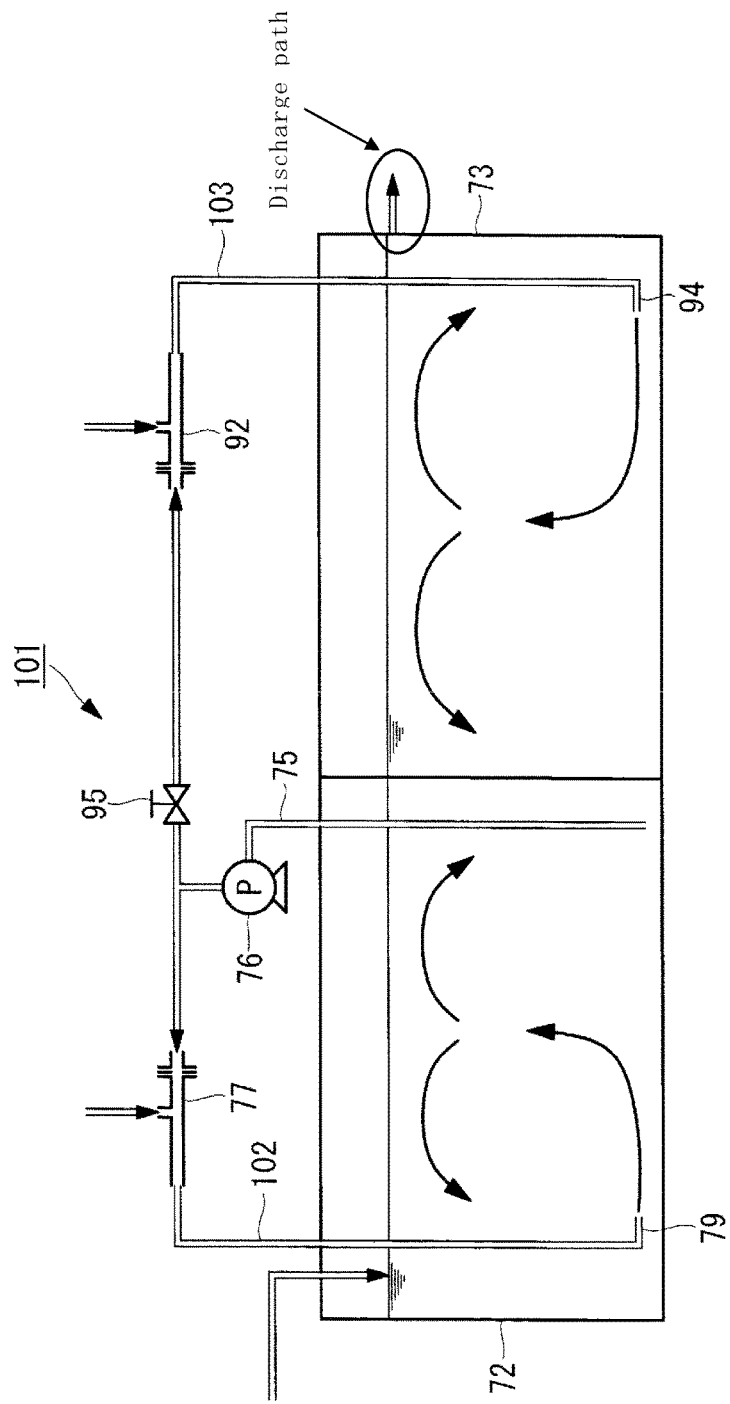
FIG. 10 is a schematic configuration diagram illustrating yet another embodiment of the water treatment device.

FIG. 10 illustrates yet another embodiment of the water treatment device. In a water treatment device 101, the gas-liquid two-phase flow pipe 78 and the gas-liquid two-phase flow pipe 93 of the water treatment device 91 of the aforementioned embodiment are replaced with another gas-liquid two-phase flow pipe 102 and another gas-liquid two-phase flow pipe 103, respectively. The gas-liquid two-phase flow pipe 102 is disposed so as to not extend through the side wall of the dispersed bacteria treatment tank 72, and to extend through the liquid surface of the dispersed bacteria mixture stored in the dispersed bacteria treatment tank 72. The gas-liquid two-phase flow pipe 102 supplies the gas-liquid two-phase flow generated by the gas-liquid two-phase flow generation device 77 to the nozzle 79. The gas-liquid two-phase flow pipe 103 is disposed so as to not extend through the side wall of the activated sludge treatment tank 73, and to extend through the liquid surface of the activated sludge mixture stored in the activated sludge treatment tank 73. The gas-liquid two-phase flow pipe 103 supplies the gas-liquid two-phase flow generated by the gas-liquid two-phase flow generation device 92 to the activated sludge treatment tank nozzle 94.

The water treatment device 101 injects the gas-liquid two-phase flow into the storage space of the dispersed bacteria treatment tank 72 at high speed, making it possible to more adequately decompose the organic matter in the waste water; and injects the gas-liquid two-phase flow into the storage space of the activated sludge treatment tank 73 at high speed, making it possible to more adequately aerate the activated sludge mixture stored in the activated sludge treatment tank 73, in the same manner as the water treatment device 91 of the aforementioned embodiment. The water treatment device 101 does not require formation of a hole through which the gas-liquid two-phase flow pipe 102 extends in the side wall of the dispersed bacteria treatment tank 72, and therefore can be more easily manufactured compared to the water treatment device 91 of the aforementioned embodiment. The water treatment device 101 does not require formation of a hole through which the gas-liquid two-phase flow pipe 103 extends in the side wall of the activated sludge treatment tank 73, and therefore can be more easily manufactured compared to the water treatment device 91 of the aforementioned embodiment.

Figure 11:
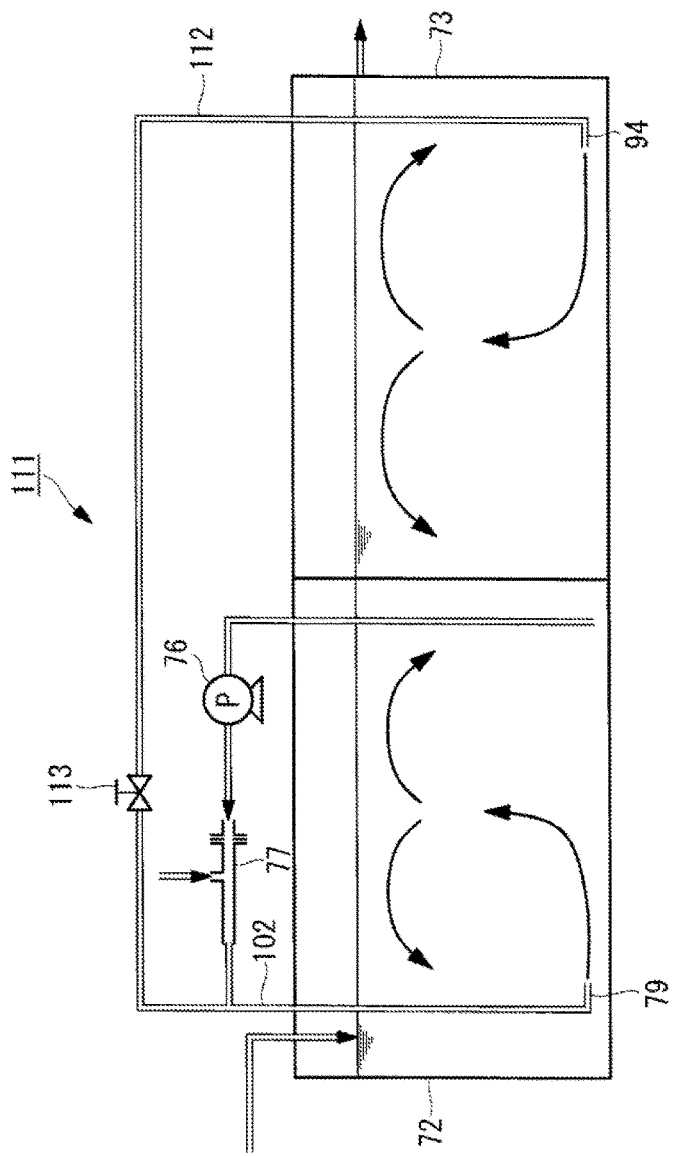
FIG. 11 is a schematic configuration diagram illustrating yet another embodiment of the water treatment device.

FIG. 11 illustrates yet another embodiment of the water treatment device. In a water treatment device 111, the gas-liquid two-phase flow pipe 103 of the water treatment device 101 of the aforementioned embodiment is replaced with another gas-liquid two-phase flow pipe 112, and a flow rate adjustment valve 113 is further included. The gas-liquid two-phase flow pipe 112 supplies the gas-liquid two-phase flow generated by the gas-liquid two-phase flow generation device 77 to the activated sludge treatment tank nozzle 94. The flow rate adjustment valve 113 is provided midway on the gas-liquid two-phase flow pipe 112. The flow rate adjustment valve 113 adjusts a flow rate of the gas-liquid two-phase flow that flows through the gas-liquid two-phase flow pipe 102, and a flow rate of the gas-liquid two-phase flow that flows through the gas-liquid two-phase flow pipe 112.

The water treatment device 111 injects the gas-liquid two-phase flow into the storage space of the dispersed bacteria treatment tank 72 at high speed, making it possible to more adequately decompose the organic matter in the waste water; and injects the gas-liquid two-phase flow into the storage space of the activated sludge treatment tank 73 at high speed, making it possible to more adequately aerate the activated sludge mixture stored in the activated sludge treatment tank 73, in the same manner as the water treatment device 101 of the aforementioned embodiment. The water treatment device 111 does not need to include the gas-liquid two-phase flow generation device 92. As a result, the water treatment device 111 can be more easily manufactured compared to the water treatment device 101 of the aforementioned embodiment.

It should be noted that the plurality of microorganism immobilizing carriers may be replaced with other carriers capable of holding non-agglomerative bacteria. Examples of the carriers include a plurality of sheet-shaped carriers each disposed along a plurality of flat surfaces that are parallel to each other. In the dispersed bacteria treatment tank filled with such carriers as well, in the same manner as the dispersed bacteria treatment tank 72 of the aforementioned embodiment, the non-agglomerative bacteria decompose the organic matter with higher efficiency, making it possible to adequately treat the waste water.

It should be noted that the activated sludge tank 73 may further include a separation membrane immersed in the activated sludge mixture. The separation membrane filters the activated sludge mixture, separating the activated sludge mixture into excess sludge and treated water, in the same manner as the separation membrane 3 of the aforementioned embodiment. The treated water is drained to an outside area at a predetermined flow rate. At this time, the nozzle 94 injects the gas-liquid two-phase flow toward the bottom portion of the separation membrane. In the activated sludge tank that includes such a separation membrane, the nozzle 94 injects the gas-liquid two-phase flow toward the bottom portion of the separation member, making it possible to adequately clean the separation membrane and adequately filter the activated sludge mixture with the separation membrane, in the same manner as the membrane separation tank 2 of the aforementioned embodiment.

REFERENCE SIGNS LIST

1: Water treatment device
2: Membrane separation tank
3: Separation membrane
5: Stored liquid
6: Circulating liquid pipe
7: Circulation pump
8: Gas-liquid two-phase flow generation device
11: Gas-liquid two-phase flow pipe
12: Nozzle
15: Flow intake pipe
16: Orifice
17: Air suction pipe
19: Line mixer
21: Water treatment device
22: Gas-liquid two-phase flow generation device
23: Gas-liquid two-phase flow pipe
24: Nozzle
51: Water treatment device
31: Water treatment device
32: Gas-liquid two-phase flow pipe
33: Plurality of nozzles
34: Liquid surface
41: Water treatment device
42: Biological oxidation tank
43: Gas-liquid two-phase flow generation device
44: Gas-liquid two-phase flow pipe
45: Nozzle
46: Stored liquid
71: Water treatment device
72: Dispersed bacteria treatment tank
73: Activated sludge treatment tank
75: Circulating liquid pipe
76: Circulation pump
77: Gas-liquid two-phase flow generation device
78: Gas-liquid two-phase flow pipe
79: Nozzle
91: Water treatment device
92: Gas-liquid two-phase flow generation device
93: Gas-liquid two-phase flow pipe
94: Activated sludge treatment tank nozzle
101: Water treatment device
102: Gas-liquid two-phase flow pipe
103: Gas-liquid two-phase flow pipe
111: Water treatment device
112: Gas-liquid two-phase flow pipe

The invention claimed is:

1. A water treatment device, comprising:
a biological treatment tank configured to store a liquid containing organisms that decompose contaminants, wherein the biological treatment tank includes:
a dispersed bacteria treatment tank filled with microorganism immobilizing carriers and configured to store a dispersed bacteria mixture having non-agglomerative bacteria that decompose dispersed contaminants;
an activated sludge treatment tank configured to store an activated sludge mixture having suspended activated sludge that decomposes the dispersed bacteria; a membrane immersed in the activated sludge treatment tank; and
a screen including a plurality of holes or gaps which does not allow passage of the microorganism immobilizing carriers therethrough, being disposed to interpose between a storage space of the dispersed bacteria treatment tank and a storage space of the activated sludge treatment tank, and configured to allow the dispersed bacteria mixture to be supplied to the activated sludge mixture;
a circulating liquid pipe connected to a bottom portion of the storage space of the dispersed bacteria treatment tank that stores the dispersed bacteria mixture;
a pump connected to the circulating liquid pipe and configured to generate a circulating liquid flow from the dispersed bacteria mixture in the dispersed bacteria treatment tank;
a gas-liquid two-phase flow generation device connected to the pump and configured to use the circulating liquid flow to suction a gas containing oxygen and thus generate a gas-liquid two-phase flow of the circulating liquid having the gas dispersed therein;
a nozzle connected to the gas-liquid two-phase flow generation device, being disposed in the bottom portion of the storage space of the dispersed bacteria treatment tank, and configured to inject the gas-liquid two-phase flow into the dispersed bacteria treatment tank; and
a discharge path connected to the storage space of the activated sludge treatment tank that stores the activated sludge mixture and configured to discharge the activated sludge mixture from the activated sludge treatment tank.

2. The water treatment device according to claim 1, wherein the activated sludge treatment tank further comprises a gas-liquid two-phase flow generation device comprising a nozzle connected to a gas-liquid two-phase flow generation device, being disposed in a bottom portion of the storage space of the activated sludge treatment tank, and configured to inject the gas-liquid two-phase flow into the activated sludge treatment tank; wherein the gas-liquid two-phase generation device is connected to receive liquid from the recirculation pipe in the dispersed bacteria treatment tank, to suction a gas containing oxygen and thus generate the two-phase flow entering the activated sludge treatment tank.

* * * * *